United States Patent [19]

Komatsu et al.

[11] Patent Number: 5,120,917
[45] Date of Patent: Jun. 9, 1992

[54] COMPOSITION FOR PREVENTING FORMATION OF SCALES IN WELDING

[75] Inventors: Tadao Komatsu, Akashi; Tadashi Nakajima, Sakai, both of Japan

[73] Assignee: Ishihara Chemical Co., Ltd., Hyogo, Japan

[21] Appl. No.: 739,380

[22] Filed: Aug. 2, 1991

Related U.S. Application Data

[62] Division of Ser. No. 557,056, Jul. 25, 1990, abandoned.

[30] Foreign Application Priority Data

Jan. 31, 1989 [JP] Japan .................................. 1-23595
Jan. 9, 1990 [JP] Japan .................................. 2-1748

[51] Int. Cl.$^5$ ........................ B23K 11/34; B23K 9/235
[52] U.S. Cl. ............................. 219/117.1; 219/137 R
[58] Field of Search ...................... 219/137 R, 117.1

[56] References Cited

U.S. PATENT DOCUMENTS 4,788,411 11/1988 Skinner .......................... 219/137 R

*Primary Examiner*—Clifford C. Shaw
*Attorney, Agent, or Firm*—Armstrong, Nikaido, Marmelstein, Kubovcik & Murray

[57] ABSTRACT

The invention provides a composition for preventing the formation of scales in resistance welding, the composition containing as the active component a reaction product prepared by reacting 1 mole of tetraethyl silicate and about 0.5 to about 1.5 moles of water, and a composition for preventing the formation of scales in arc welding, the composition containing as the active component a reaction product prepared by reacting 1 mole of tetraethyl silicate, about 1 to about 30 moles of triethyl borate and about 0.5 to about 1.5 moles of water.

2 Claims, No Drawings

COMPOSITION FOR PREVENTING FORMATION OF SCALES IN WELDING

This is a continuation of application Ser. No. 557,056 filed July 25, 1990, now abandoned.

FIELD OF THE INVENTION

The present invention relates to a composition for preventing the formation of scales during arc welding and resistance welding.

BACKGROUND OF THE INVENTION

Heretofore resistance welding (e.g. spot welding) and arc welding utilizing an electric energy have been conducted in a wide range of industrial fields and are both currently important, indispensable techniques in industries.

Resistance welding, typically spot welding, entails the most serious problem of forming a film of oxide on oxidation of the parts of a steel plate or the like to be welded or neighboring parts due to the intensive heat given off during welding. The oxide film or scale is usually in the form of a brown ring and responsible for deteriorated appearance of articles and possibly for impaired functions of articles. Such scales have been removed by means of at least one of procedures such as acid washing, electrolysis, polishing, sandblasting and the like. However, these techniques have the drawbacks of e.g., marring the base-metal surfaces and involving time-consuming labor.

Attempts have been made to prevent scales from forming in order to obviate the foregoing problems. For example, the metal parts to be welded have been shielded with an non-oxidizing gas. The method, however, is expensive but unsatisfactory in the result. Another proposed method is to apply a coating of oil, resin or the like on the parts to be welded or adjacent parts to form a barrier film against the oxygen in the atmosphere. The method is also ineffective and disadvantageous in that the coating hinders welding and that the adhered coating is difficult to remove.

We developed a composition for preventing the scaling in resistance welding which composition contains as the active component a water-soluble silicone represented by a specific chemical formula (Japanese Unexamined Patent Publication No. 299865/1988). Yet the proposed composition is occasionally unable to prevent the scaling under severe welding conditions although able to produce good results under normal welding conditions.

Arc welding such as TIG or MIG arc welding poses the problem of producing scales on oxidation of the joint to be welded or adjacent parts (about 1 cm in width in the vicinity of the bead in TIG arc welding) due to the intensive heat (momentarily about 900° C.) given off during welding (although on different principles of heat generation). Efforts have been made in this case to remove the scales by the same methods as employed in resistance welding and to inhibit the formation of scales by methods identical with or close to those done in resistance welding, using a scale-preventing agent, but without satisfactory result.

SUMMARY OF THE INVENTION

It is the main object of the present invention to provide a composition for effectively preventing the formation of scales or markedly decreasing the degree of scaling in resistance welding and arc welding.

It is another object of the invention to provide a composition for preventing the formation of scales (hereinafter referred to as "scaling inhibitor") which composition, even if adhered to the welded joint or adjacent parts, would be easily removed by means of a simple procedure such as water washing.

Other objects and features of the invention will become apparent from the following description.

According to the invention, there are provided:

(i) a composition for preventing the formation of scales in resistance welding, the composition containing as the active component a reaction product prepared by reacting 1 mole of tetraethyl silicate and about 0.5 to about 1.5 moles of water (which will be hereinafter referred to as "first invention"); and (ii) a composition for preventing the formation of scales in arc welding, the composition containing as the active component a reaction product prepared by reacting 1 mole of tetraethyl silicate, about 1 to about 30 moles of triethyl borate and about 0.5 to about 1.5 moles of water (which will be hereinafter referred to as "second invention").

DETAILED DESCRIPTION OF THE INVENTION

The first invention and second invention will be described below in greater detail.

I. First Invention

The tetraethyl silicate serving as one of the components for the reaction product to be used in the first invention is a colorless, transparent liquid having a molecular weight of about 208 and a boiling point of about 165° C. and represented by the formula.

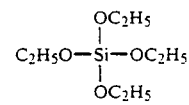

The reaction product of tetraethyl silicate and water which is used in the first invention is formed by hydrolysis of tetraethyl silicate and water in a liquid medium in the presence of a catalyst.

The liquid medium for use in the reaction needs to be homogeneously miscible with the tetraethyl silicate, water and the reaction product of these components. The list of useful liquid mediums is given below.

| Liquid Medium | Boiling point (°C.) | Melting point (°C.) | Molecular weight |
|---|---|---|---|
| N-methylpyrrolidone | 202 | −24.4 | 99 |
| Ethylene glycol | 198 | −12.6 | 62 |
| Diethylene glycol | 245 | −6.5 | 106 |
| Triethylene glycol | 288 | −4.3 | 150 |
| Tetraethylene glycol | 327 | −6.2 | 194 |
| Butyl carbitol | 230 | <−68.1 | 162 |
| Triethylene glycol monoethyl ether | 256 | −44 | 178 |
| Propylene glycol | 187 | −59.5 | 76 |
| Dipropylene glycol | 232 | −40 | 134 |
| Tripropylene glycol monomethyl ether | 243 | <−70 | 206 |
| 1,5-Pentanediol | 242 | −15.6 | 104 |
| Hexylene glycol | 197 | −50 | 118 |
| Gamma-butyrolactone | 204 | −43.5 | 86 |
| Propylene carbonate | 242 | −48.8 | 102 |

-continued

| Liquid Medium | Boiling point (°C.) | Melting point (°C.) | Molecular weight |
|---|---|---|---|
| PEG (#400) | >300 | 4–10 | Approx. 400 |
| PPG (#400) | >300 | −45 | Approx. 400 |
| POE-POP block polymer | >300 | −29 | Approx. 2000 |

The listed mediums are all miscible with water.

POE stands for polyoxyethylene and POP for polyoxypropylene. The POE-POP block polymer includes, for example, Pluronic L-61 (tradename for product of Asahi Denka K.K.).

The listed liquid mediums have a high boiling point of 180° C. or higher and after completion of the reaction can be used itself as the solvent having the reaction product incorporated therein. The liquid medium may be used as such after distilling off the ethanol formed as a by-product during the reaction. In case of distillation, care must be taken to avoid causing the reaction product to become turbid at high temperatures. The reaction product-containing liquid medium with a boiling point of less than 180° C. is not suitable for use because the medium applied on the metal parts to be welded evaporates into the atmosphere due to the heat emitted during resistance welding, failing to form a barrier film for effective protection against the oxygen in the atmosphere.

The scaling inhibitor of the first invention can be prepared also by mixing the above high-boiling liquid medium with the reaction product prepared by hydrolyzing tetraethyl silicate with water in a low-boiling liquid medium up to 140° C. in the boiling point in the presence of a catalyst. Such low-boiling liquid medium must be homogeneously miscible with tetraethyl silicate, water and the reaction product of these components. Examples of the low-boiling liquid medium useful in the invention are ethyl alcohol, isopropyl alcohol and like lower alkyl alcohols, acetone, methyl ethyl ketone and like ketones, methyl acetate, ethyl acetate and like esters, etc. In use of a low-boiling liquid medium, a high-boiling one may be added after distilling off the low-boiling liquid medium, unreacted water and ethyl alcohol formed as a by-product from the reaction mixture.

Acids and alkalis are used as the catalyst in the preparation of the reaction product from tetraethyl silicate and water as the active component in the scaling inhibitor of the first invention. Examples of useful acid catalysts are hydrochloric acid, sulfuric acid, nitric acid, hydrochloric acid, acetic acid, formic acid, oxalic acid, etc. Useful alkali catalysts include ammonia, triethanolamine, dipropylamine, butylamine, sodium hydroxide, etc. The amount of the catalyst used is not critical, and is usually about 0.0025 to about 0.02 mole, preferably about 0.01 mole, per mole of the tetraethyl silicate.

The active component in the scaling inhibitor of the first invention can be prepared by the following method. Tetraethyl silicate and water are added to a high-boiling liquid medium (with a boiling point of 180° C. or higher) or a low boiling liquid medium (with a boiling point of up to 180° C.) in an amount of about 0.4 to about 1.5 times (molar ratio) the amount of tetraethyl silicate. The mixture is reacted at a temperature of 0° to about 80° C., preferably about 15° to about 50° C., in the presence of a catalyst. When the liquid medium is used in an amount of less than 0.4 mole per mole of tetraethyl silicate, an opaque, nonhomogeneous reaction product tends to be produced. On the other hand, more than of 1.5 moles of the liquid medium used reduces the reaction rate. An excess amount of high-boiling liquid medium used decreases the concentration of the active component in the scaling inhibitor, impairing the scale-preventing ability of the inhibitor. The water is used usually in an amount of about 0.5 to about 1.5 mole per mole of the tetraethyl silicate. The tetraethyl silicate and water are preferably mixed at an equimolar ratio. When the reaction temperature exceeds 80° C., the ethanol produced in the reaction boils, tending to bring about the nonhomogeneity of reaction product. The reaction time is not specifically limited and is variable depending on the amounts of the starting materials used, the reaction temperature and the like, but usually in the range of about 40 to about 80 minutes. Usually the tetraethyl silicate, water and liquid medium are used in an equimolar ratio, and most advantageously reacted for at about 15° to about 50° C. for about 60 to about 70 minutes.

When a high-boiling liquid medium is added after the hydrolysis of tetraethyl silicate and water in a low-boiling liquid medium (with a boiling point of less than 180° C.) in the presence of a catalyst, it is preferred to use about 40 to about 150 parts by weight of the high-boiling liquid medium per 100 parts by weight of the reaction product. Less than 40 parts by weight of the high-boiling medium used reduces the degree of scale-preventing ability, whereas more than 150 parts by weight of the medium used leads to excessive dilution of the active component, resulting in failure to fully achieve the desired results.

When the scaling inhibitor of the first invention is used, the hydrolyzate of tetraethyl silicate is retained for a prolonged period of time on the surface of a steel plate or the like heated to a high temperature by the electrical resistance, because of the presence of a high-boiling liquid medium while the reaction product forms a silica-containing, heat-resistant, fuse vitreous continuous layer on the heated parts for protection against the oxygen in the atmosphere, thereby inhibiting scaling during resistance welding such as spot welding.

Moreover, the scaling inhibitor of the first invention and the vitreous layer of the inhibitor are chemically inert to the base metal in a low to high temperature range and adversely affect the metal under no circumstance.

The scaling inhibitor of the first invention may contain conventional additives. Aluminum, titanium, zirconium or the like as used increases the melting point of heat-resistant fuse vitreous continuous layer so that the resulting scaling inhibitor can effectively protect the base metal against the oxygen in the atmosphere at higher temperatures. Yttrium, cerium or like rare earth elements decrease the viscosity and surface tension of fuse vitreous continuous layer, rendering the layer more uniform and better in wetting. Also rare earth elements can prevent the surface of stainless steel from oxidizing. The amount of these additives is not specifically limited but usually in the range of about 0.01 to about 0.1 mole per mole of the tetraethyl silicate.

The scaling inhibitor of the first invention can be easily removed from the metal after welding by brushing, water washing or like means.

II. Second Invention

The triethyl borate serving as one of the starting materials for the reaction product to be used in the preparation of the scaling inhibitor of the second invention is a colorless, transparent liquid having a molecular weight of about 146 and a boiling point of about 118.6° C. and represented by the formula

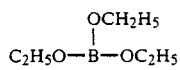

$$C_2H_5O-\underset{\underset{OC_2H_5}{|}}{B}-OC_2H_5$$

In the second invention, the reaction product of tetraethyl silicate, water and triethyl borate is used as the active component in the inhibitor. The reaction product is prepared by hydrolysis of tetraethyl silicate, water and triethyl borate in the presence of a catalyst.

Usable as the catalyst are acids and alkalis. Useful catalysts include those useful for the preparation of the reaction product for use in the first invention.

The active component in the scaling inhibitor of the second invention is usually synthesized as follows. Water is added to a mixture of tetraethyl silicate and triethyl borate in a molar ratio of 1:1-30. The mixture is reacted in the presence of a catalyst at a temperature of 0° to about 80° C., preferably about 15° to about 50° C. If less than 1 mole of triethyl borate is used per mole of tetraethyl silicate, the obtained reaction product has such a high melting point that the resulting scaling inhibitor can not fully prevent the formation of scales in a low temperature range. On the other hand, if more than 30 moles of triethyl borate is used per mole of tetraethyl silicate, the obtained reaction product has such a low melting point that cracks are likely to develop since the low-boiling component gathers in the metal grain boundary in the solidification of the crater formed in the bead end during welding. The amount of water used is usually about 0.5 to about 1.5 moles, preferably about 1 mole, per mole of the tetraethyl silicate. If less than 0.5 mole of water is used, a large amount of the unreacted tetraethyl silicate remains in the reaction product and decreases the scale-preventing ability of the inhibitor, and a water-insoluble component is formed with the result that the oily stain is left after water washing. If more than 1.5 moles of water is used per mole of tetraethyl silicate, a hard gel-like substance is formed with the progress of hydrolysis and polymerization of the reaction product during storage, whereby the liquid scaling inhibitor is rendered unable to prevent scaling. When the reaction temperature exceeds 80° C., the ethanol produced by the reaction boils, tending to give a nonhomogeneous reaction product. The reaction time is not specifically limited and varies depending upon the amounts of the starting materials, the reaction temperature and the like, but usually ranges from about 40 to about 80 minutes. Most advantageously the reaction is conducted at a temperature of about 15° to about 50° C. for about 60 to about 70 minutes using teraethyl silicate, triethyl borate, water and a liquid medium in the specific molar ratio.

Stated more specifically, the reaction product for use in the second invention can be prepared, for example, by the following methods.

(a) The specified proportions of tetraethyl silicate and triethyl borate are mixed together and stirred until a homogeneous liquid is formed. The specific amounts of water and catalyst are added to the liquid, and the mixture is further reacted with stirring.

(b) The specific amount of tetraethyl silicate and a portion of triethyl borate to be used are mixed and stirred. Water and a catalyst are added and the mixture is stirred. The remaining amount of triethyl borate is added, followed by stirring.

(c) When welding conditions are not severe and the scaling inhibitor need not have a high scale-preventing ability, a low-boiling organic solvent with a boiling point of less than 140° C. which is uniformly miscible with the reaction system (starting materials or the reaction product) may be added before or after the reaction in the above step (a) or (b) to give a diluted liquid containing at least 80% by weight of the reaction product. Examples of such low-boiling solvents are ethyl alcohol, isopropyl alcohol and like lower alkyl alcohols, acetone, methyl ethyl ketone and like ketones, methyl acetate, ethyl acetate and like esters, etc. The diluted liquid has a low vicosity and thus can be easily applied onto the base-metal surfaces to be welded.

The low-boiling solvent to be used in the above step (c) as well as the ethanol produced as a by-product in the reaction is combustible. Nevertheless the solvent is evaporated off substantially wholly within a short time of about 2 to about 7 minutes after the application of the scaling inhibitor to the base metal and thus is unlikely to burn during welding. Yet care should be taken to avoid causing a fire during storage. When required, the low-boiling solvent, unreacted water and ethyl alcohol as a by-product may be removed from the mixture by distillation, and a non-combustible solvent may be added to provide a non-combustible diluted liquid for use.

The reaction product to be used as the active component in the second invention has a composite network comprising chain combinations of silicon-oxygen (—Si—O—) formed from tetraethyl silicate and chain combinations of boron-oxygen (—B—O—) formed from triethyl borate, all complicatedly linked to one another. When the scaling inhibitor of the second invention is used, first a fuse vitreous film of —B—O— net is formed in a low temperature range and a film of —Si—O— net is formed in a high temperature range to retain the fuse vitreous film. As a result, a silica-containing, heat-resistant, fuse vitreous continuous layer is formed on the surface of a steel plate or the like heated to a high temperature by an electric arc to cover the heated base-metal zone which is thereby protected against the oxygen in the atmosphere, and prevented from scaling. The formation of silica-containing, heat-resistant, fuse vitreous continuous layer is initiated at 200° C. (at which the oxidation of copper plate is said to start) and the formed layer is retained even at 900° C. or higher. With this feature, the scaling inhibitor of the second invention can prevent the formation of scales effectively in arc welding such as TIG welding and MIG welding.

The scaling inhibitor of the second invention may contain the same conventional additives as incorporated in the scaling inhibitor of the first invention.

The scaling inhibitor of the second invention and the vitreous film of the inhibitor are chemically inert to the base metal in a low to high temperature range and adversely affect the metal under no circumstance.

The scaling inhibitor of the second invention applied to the base metal can be easily eliminated by simple means such as brushing or water washing.

Silicates containing methyl, isopropyl, butyl or like alkyl groups are usable in place of the tetraethyl silicate for use in the preparation of the reaction product in the first invention. Borates containing such alkyl groups are usable in lieu of the triethyl borate for use in the preparation of the reaction product in the second invention. The scale inhibitors containing the reaction product produced from such silicates or borates, although as effective in preventing scaling as the inhibitor of the invention, are not suitable for use since their use is legally limited because of the presence of methyl alcohol, isopropyl alcohol, butyl alcohol or the like formed in the reaction as a by-product which is deleterious to humans.

EXAMPLES

Given below are examples and comparison examples to clarify the features of the present invention in greater detail.

EXAMPLE 1

Tetraethyl silicate (hereinafter referred to as "TES"), water and a catalyst were reacted in a high-boiling liquid medium at 50° C. for 60 minutes, giving a scaling inhibitor. In this way, eight samples of scaling inhibitor (Samples Nos. 1 to 8) were prepared. Table 2 below shows the amount and kind of the liquid mediums and catalysts used and the amount of water used, the amounts being expressed in mole per mole of TES.

In Table 2, Samples Nos. 1 to 5 were prepared as examples of the present invention and Samples Nos. 6 to 8 as comparison examples.

TABLE 2

| | Amounts of ingredients per mole of TES | | |
|---|---|---|---|
| | High-boiling liquid medium | Water | Catalyst |
| Sample No. 1 | Propylene glycol - 1 mole | 1 mole | HCl 0.01 mole |
| Sample No. 2 | Butyl carbitol - 1 mole | 1 mole | HCl 0.01 mole |
| Sample No. 3 | Triethylene glycol - 1 mole | 1 mole | HCl 0.01 mole |
| Sample No. 4 | PPG (#400) - 70 wt. % | 1 mole | HCl 0.01 mole |
| Sample No. 5 | POE-POP block polymer - 70 wt. % | 1 mole | HCl 0.01 mole |
| Sample No. 6 | Methyl cellosolve (b.p. 124° C.) - 1 mole | 1 mole | HCl 1 mole |
| Sample No. 7 | N-Methyl pyrrolidone - 1 mole | None | None |
| Sample No. 8 | PEG (#400) - 1 mole | None | None |

Samples Nos. 7 and 8 are comparison examples of inhibitors prepared merely by mixing the ingredients without reaction taking place, namely without hydrolysis occurring even when heated. Sample No. 6 is a comparison example of inhibitor prepared using a liquid medium having a low boiling point.

The samples obtained above were each applied to the surface of a stainless steel plate (SUS-301L, DF finishing, thickness 1.5 mm) by brushing once. On application, resistance welding was conducted on the coated steel plate under the following conditions.

WELDING CONDITIONS

Material for Welding two stainless steel plates of the foregoing type superposed on each other Electrodes for Resistance Welding upper and lower electrodes both having a diameter of 16 mm Welding current—9100 A Pressure applied—600 kg.f Resistance welding time—25 cycles After welding, the steel plates were washed with water to remove the inhibitor applied. The weldment formed by pressure welding with the welding electrodes was observed with the unaided eye to inspect the degree of scaling, with the results shown in Table 3.

TABLE 3

| Sample No. | Degree of scaling after resistance welding | Water washability |
|---|---|---|
| 1 | No scaling | Good |
| 2 | No scaling | Good |
| 3 | No scaling | Good |
| 4 | No scaling | Good |
| 5 | No scaling | Good |
| 6 | Pale brown scale in the shape of a ring | Difficult to remove |
| 7 | Brown scale in the shape of a ring | Difficult to remove |
| 8 | Brown scale in the shape of a ring | Difficult to remove |

Table 3 reveals that Samples Nos. 1 to 5 (examples of the invention) have an excellent ability to inhibit scaling as compared with the samples prepared as comparison examples, and are outstanding in water washability after application.

The above test was conducted under severe welding conditions. Consequently the test results show that the scaling inhibitors of the invention are excellent and can prevent scaling in resistance welding under such severe conditions.

EXAMPLE 2

To 1 mole of ethyl alcohol as a low-boiling solvent were added 1 mole of TES, 1 mole of water and 0.01 mole of hydrochloric acid as a catalyst. The mixture was reacted at 50° C. for 60 minutes, whereby a polymerization product was obtained on hydrolysis of TES (excepting Samples Nos. 16 and 17 in Table 4).

Diluents as shown in Table 4 were each added to the obtained product in the listed amount.

In Table 4, Samples Nos. 9 to 13 correspond to the products diluted with a high-boiling solvent or a surfactant according to the invention. Samples Nos. 14 to 18 were obtained as comparison examples. Samples Nos. 16 and 17 as comparison examples were each obtained by adding a diluent to the TES left unreacted without addition of water and a catalyst. Sample No. 18 was produced without addition of a diluent for a blank test.

TABLE 4

| Sample No. | Kind and amount of diluent |
|---|---|
| 9 | Hexylene glycol in the same amount as the product |
| 10 | Dipropylene glycol in the same amount as the product |
| 11 | Tetraethylene glycol in the same amount as the product |
| 12 | PPG #400 in the same amount as the product |
| 13 | POE-POP block polymer in the same amount as the product |
| 14 | Ethyl cellosolve (b.p. 136° C.) in the same amount as the product |
| 15 | Ethanol in the same amount as the product |

TABLE 4-continued

| Sample No. | Kind and amount of diluent |
| --- | --- |
| 16 | 1,5-Pentanediol in an equimolar amount with respect to the unreacted material |
| 17 | PEG #400 in an amount of 70 wt. % of the unreacted material |
| 18 | No diluent |

The 10 kinds of compositions were used as a scaling inhibitor in resistance welding in the same manner as in Example 1. Table 5 below shows the results.

TABLE 5

| Sample No. | Degree of scaling after resistance welding | Water washability |
| --- | --- | --- |
| 9 | No scaling | Good |
| 10 | No scaling | Good |
| 11 | No scaling | Good |
| 12 | No scaling | Good |
| 13 | No scaling | Good |
| 14 | Pale brown scale in the shape of a ring | Difficult to remove |
| 15 | Deep brown scale in the shape of a ring | Difficult to remove |
| 16 | Deep brown scale in the shape of a ring | Difficult to remove |
| 17 | Deep brown scale in the shape of a ring | Difficult to remove |
| 18 | Brown scale in the shape of a ring | Difficult to remove |

Table 5 shows that Samples Nos. 9 to 13 prepared as examples of the present invention exhibited an excellent ability to inhibit scaling even in the welding conducted under severe conditions, and were satisfactory in water washability after application. On the other hand, Samples Nos. 14 to 18 as comparison examples were inferior in the ability to inhibit scaling and unsatisfactory in water washability.

EXAMPLE 3

Tetraethyl silicate, triethyl borate (hereinafter referred to as "TEB") and water were mixed together in the amounts as listed below in Table 6, giving a composition (Samples Nos. 19 to 29). A 0.01 mole quantity of hydrochloric acid serving as a catalyst was added to each composition to conduct polymerization by hydrolysis at 50° C. for 60 minutes. In this manner 11 kinds of reaction products were obtained.

One mole of ethyl cellosolve as a low-boiling solvent was added in preparation of Sample No. 28.

One mole of N-methyl pyrrolidone as a high-boiling solvent was added in preparation of Sample No. 29.

TABLE 6

| Sample No. | TES (mole) | TEB (mole) | Water (mole) |
| --- | --- | --- | --- |
| 19 | 1 | 1.5 | 1 |
| 20 | 1 | 25 | 1 |
| 21 | 1 | 0 | 1 |
| 22 | 1 | 0.5 | 1 |
| 23 | 1 | 35 | 1 |
| 24 | 1 | 20 | 0.6 |
| 25 | 1 | 20 | 1.4 |
| 26 | 1 | 20 | 0.3 |
| 27 | 1 | 20 | 2 |
| 28 | 1 | 20 | 1 |
| 29 | 1 | 20 | 1 |

In Table 6, Samples Nos. 19 to 23 were prepared using TEB in a varied molar ratio, and TES and water in a constant molar ratio. Samples Nos. 19 and 23 were obtained by mixing the foregoing ingredients in the amounts in the range defined in the present invention. The other samples were prepared as comparison examples by mixing the ingredients in the amounts outside the range of the invention.

Samples Nos. 24 to 29 were produced by using water in a varied molar ratio, and TES and TEB in a constant molar ratio. Samples Nos. 24, 25 and 28 were prepared by mixing the ingredients in the amounts within the limited range of the invention. Sample No. 29 was prepared as a comparison example by adding a high-boiling solvent in the amounts within the range of the invention. The other samples were prepared as comparison examples by mixing the ingredients in the amounts outside the range.

The 11 reaction products thus obtained were each applied to a base metal and TIG arc welding was performed under the following conditions. Table 7 below shows the results.

Test conditions

Base metal—stainless steel plate (SUS 430, #4 finishing, thickness 1.2 mm)

Electrodes for TIG arc welding—1.6 cm diameter (a rod made of thorium-containing tungsten)

Welding current—60 A

Welding speed—40 cm/min

Welding rod—not used (base-metal surfaces directly joined)

Gas—argon, 5 l/min

The above reaction products were each applied to the surface side of the weldline on the stainless steel plate by brushing once and the coated steel plate was airdried. Five minutes later, TIG arc welding was conducted under the aforementioned conditions to join the base metal surfaces without use of a filler metal.

After welding, the weldment was washed with water to remove the reaction product applied and the result was observed with the unaided eye to evaluate the degree of scaling on the surface of the welded parts.

TABLE 7

| Sample No. | Degree of scaling | Cracking in crater | Water washability |
| --- | --- | --- | --- |
| 19 | No scaling | None | Good |
| 20 | No scaling | None | Good |
| 21 | Strip of brown scale | None | Difficult to remove |
| 22 | Strip of brown scale | None | Good |
| 23 | No scaling | Cracking | Good |
| 24 | No scaling | None | Good |
| 25 | No scaling | None | Good |
| 26 | Strip of brown scale | None | Unsatisfactory |
| 27 | Gelled and impossible to use | — | — |
| 28 | No scaling | None | Good |
| 29 | Carbonized into soot Slight degree of scaling | None | Unsatisfactory |

Table 7 reveals the followings. A lesser amount of TEB used results in scaling, whereas a larger amount of TEB used leads to cracking in the crater. A smaller amount of water used is responsible for scaling and decrease of water washability and a larger amount of water gives rise to gelation. Moreover, a high-boiling solvent is not suitable for use.

Table 7 also shows that neither scaling nor cracking in the crater are caused and satisfactory water washability is given by application of the inhibitors prepared from the ingredients in the amounts within the limited range of the invention.

The scaling inhibitors prepared as the examples of the present invention applied to the rear side of the welded metal parts are, of course, effective for preventing the scaling on the rear side.

What is claimed is:

1. In the process of resistance welding, including juxtaposing parts to be welded together; applying electric current through said juxtaposed parts by means of electrode means; and heating said juxtaposed parts, by means of their internal resistance to the flow of said electric current, to a temperature sufficient to cause said parts to become welded together; the improvement, whereby inhibiting the formation of scale on said parts during said welding, which comprises, prior to said welding, applying to said parts, on at least that portion of the surface thereof which will be welded, a composition consisting essentially of: 100 parts by weight of a reaction product prepared by reacting 1 mole of tetra ethyl silicate with about 0.5 to 1.5 moles of water; and about 40 to 150 parts by weight of a liquid medium having a boiling point of at least 180° C.

2. In the process of arc welding, including juxtaposing parts to be welded together; striking an arc between said parts and electrode means; applying an electric current to said electrode means in an amount sufficient to cause said juxtaposed parts to be heated to a temperature sufficient to cause said parts to become welded together; the improvement, whereby inhibiting the formation of scale on said parts during said welding, which comprises, prior to said welding, applying to said parts, on at least that portion of the surface thereof which will be welded, a composition consisting essentially of: at least 80% by weight of a reaction product prepared by reacting 1 mole of tetraethyl silicate, about 1 to 30 moles of triethyl borate, and about 0.5 to 1.5 mole of water; and up to 20% by weight of an organic liquid having a boiling point of up to 140° C.

* * * * *